United States Patent [19]
Morton et al.

[11] Patent Number: 5,492,655
[45] Date of Patent: Feb. 20, 1996

[54] AIR/LIQUID STATIC FOAM GENERATOR

[75] Inventors: Lowell K. Morton, Greenville, S.C.;
Kent R. Matthews, Littleton, Colo.

[73] Assignee: Schuller International, Inc., Denver, Colo.

[21] Appl. No.: 250,981

[22] Filed: May 31, 1994

[51] Int. Cl.$^6$ .................................................. B01F 3/04
[52] U.S. Cl. ................................. 261/76; 261/DIG. 26; 239/432; 239/433
[58] Field of Search .............................. 261/DIG. 26, 76; 239/432, 433

[56] References Cited

U.S. PATENT DOCUMENTS

| | | | |
|---|---|---|---|
| 2,390,280 | 12/1945 | Timpson | 261/DIG. 26 |
| 3,155,472 | 11/1964 | Huppke | 261/DIG. 26 |
| 3,286,992 | 11/1966 | Armeniades et al. | 261/DIG. 26 |
| 3,467,072 | 9/1969 | Toesca | 261/76 |
| 3,934,641 | 1/1976 | Chielens | 239/433 |
| 4,394,289 | 7/1983 | Brown et al. | 261/DIG. 26 |
| 4,545,157 | 10/1985 | Saurwein | 239/433 |
| 4,929,088 | 5/1990 | Smith | 366/337 |
| 5,381,957 | 1/1995 | Bianco | 239/432 |

FOREIGN PATENT DOCUMENTS 0675192   8/1979   U.S.S.R. .................... 261/DIG. 26

OTHER PUBLICATIONS

WIPO application WO83/01395, 28 Apr. 1983, Pacifici.

*Primary Examiner*—Tim R. Miles
*Attorney, Agent, or Firm*—Cornelius P. Quinn

[57] ABSTRACT

An air/liquid polymeric latex foam coating generator includes a static splash plate mixer for forming a coarse foam coating and a conventional static refining mixer which further refines and homogenizes the coarse foam produced by the static splash plate mixer before delivering a refined foam to application heads or nozzles for application to a workpiece. The static splash plate mixer comprises a housing which is divided into two chambers by a splash plate. A stream of pressurized air and a stream of pressurized polymeric latex coating material are introduced into the upstream chamber where the streams intersect each other, impinge upon the splash plate and are mixed into a coarse foam in the upstream chamber. The foam passes through openings in the splash plate to the downstream chamber where the foam is further refine before being discharged from the static splash plate mixer.

14 Claims, 1 Drawing Sheet

5,492,655

AIR/LIQUID STATIC FOAM GENERATOR

BACKGROUND OF THE INVENTION

There is often a need to perform coating operations in small "job shops" where glass fiber duct board and similar workpieces are cut and fabricated into ductwork for heating, ventilating and air conditioning systems. While workpieces such as glass fiber duct boards are sometimes coated by the duct board manufacturer to encapsulate glass fibers and dust within the duct boards prior to the shipment of the duct boards to the job shops, the cutting of grooves in the duct boards at the job shops during the fabrication of the ductwork exposes glass fibers and dust in the groove surfaces. Accordingly, there has been a need to coat the surfaces of the grooves formed in the duct boards to encapsulate the glass fibers and any dust created during the grooving operation within the surfaces of the grooves.

Conventional low volume foam generators are available that could perform this foaming operation. However, these conventional low volume foam generators typically sell for over $13,000.00 and many of the small job shops can not afford such an expenditure. Thus, there has been a need for a simple, low cost, effective foam generator to serve this market. The foam generator of the present invention, which would cost about $1,000.00 or less, satisfies the needs of this relatively low volume, job shop market where, typically, about 8 drums of a liquid polymeric coating per year would be utilized by the ductwork fabricator.

SUMMARY OF THE INVENTION

The static foam generator of the present invention is simple, having no moving parts, such as, moving vanes or agitators which are present in conventional foam generators, and is very effective. The static foam generator comprises a liquid latex coating feed tank, a source of pressurized air or other gas (hereinafter referred to as "air"), a static air/liquid splash plate mixer, a static refiner, and foam application heads or nozzles. The static splash plate mixer comprises a tubular housing with a splash plate mounted within the tubular housing which divides the housing into an upstream chamber and a downstream chamber. The upstream chamber is provided with an air inlet which introduces a stream of pressurized air into the upstream chamber and a liquid inlet which introduces a stream of pressurized liquid latex coating into the upstream chamber. The streams of air and liquid polymeric latex coating intersect at or just upstream of the central portion of the splash plate. The upstream surface of the splash plate is concave and after the air and liquid polymeric latex coating impinge upon the splash plate, the air and the liquid polymeric latex coating are further mixed together in a turbulent whirling or circular motion to form a foam. The foam mixture of air bubbles and liquid polymeric latex coating then passes through openings in the splash plate, located adjacent the periphery of the splash plate, and into the downstream chamber from which the air/latex foam coating is delivered to the static refining mixer for further refinement.

In the static refining mixer, the foam mixture of air and latex coating is further refined and homogenized to reduce the size of the air bubbles and more evenly distribute the air bubbles throughout the polymeric latex coating. The refining mixer typically has a tubular housing with tabs or helical elements mounted within the housing that further blend the air and latex coating foam mixture as the foam mixture flows over the tabs or helical elements. From the refining mixer, the air and polymeric latex foam coating is delivered under pressure to application heads or nozzles where the polymeric latex foam coating is applied to a workpiece.

DESCRIPTION OF THE PREFERRED EMBODIMENTS

Figure 1:
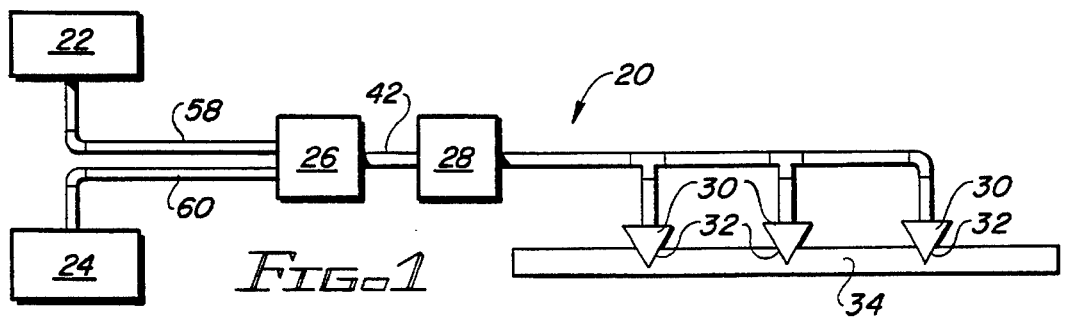
FIG. 1 is a schematic view of the static foam generator of the present invention.

FIG. 1 schematically illustrates the static foam generator 20 of the present invention. The static foam generator 20 comprises a source of pressurized air 22, a pressurized liquid polymeric latex coating feed tank 24, an air/liquid static splash plate mixer 26, a static refining mixer 28, and foam application heads or nozzles 30. As shown, the static foam generator 20 is applying a foam coating on the surfaces of the grooves 32 of a glass fiber duct board 34.

Figure 2:
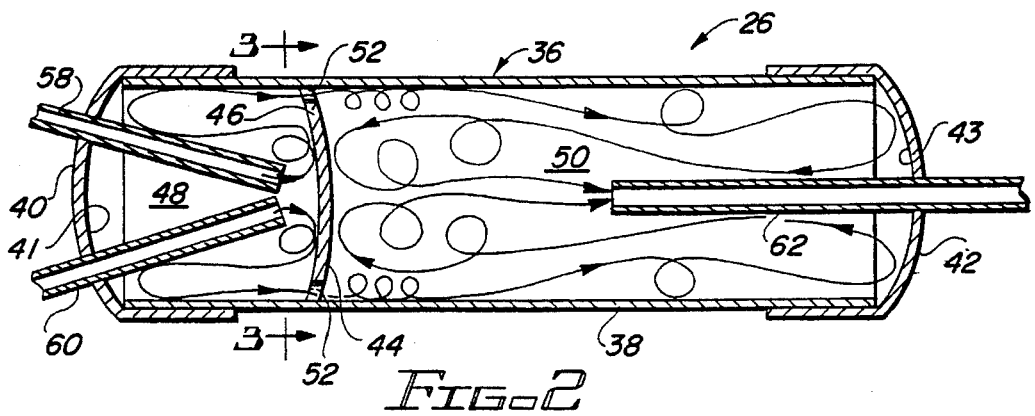
FIG. 2 is a longitudinal section through the static splash plate mixer of the present invention.

As shown in FIG. 2, the static air/liquid splash plate mixer 26 comprises a tubular housing 36 having a tubular midsection 38, an upstream end cap 40, and a downstream end cap 42. The end caps 40 and 42 both have concave inner end surfaces 41 and 43 and are threaded onto, adhesively bonded to or otherwise mounted on each end of the tubular midsection 38 to form the tubular housing 36. The tubular midsection 38 and the end caps 40 and 42 are typically made of a PVC plastic or stainless steel. While the housing 36 shown has a circular cross section, if desired, the housing can have oval, square or other cross sectional configurations.

A static splash plate disc 44 is mounted within and adhesively or otherwise secured to the tubular midsection 38 of the housing adjacent the upstream end of the tubular midsection. The static splash plate disc 44 is typically made of a PVC plastic or stainless steel and has a concave upstream surface 46. The static splash plate disc 44 has a peripheral edge configuration which is complementary in diameter to the inside diameter of the tubular midsection 38 and divides the housing 36 into an upstream chamber 48 and a downstream chamber 50.

Figure 3:
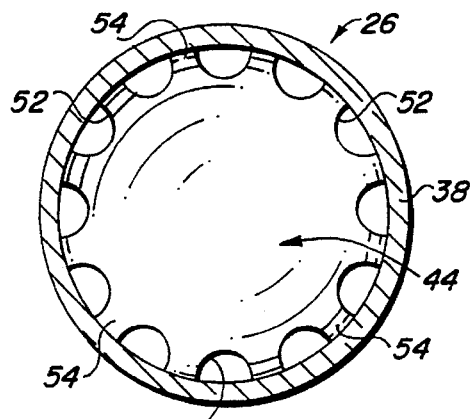
FIG. 3 is a view of the upstream concave surface of a splash plate disc used in the static splash plate mixer taken substantially along lines 3—3 of FIG. 2.

As best shown in FIG. 3, the static splash plate disc 44 has a scalloped peripheral edge which defines semi-circular discharge openings 52 through which the air/liquid polymeric latex coating foam mixture passes from the upstream chamber 48 to the downstream chamber 50. The scalloped openings 52 are defined by a series of peripherally spaced tabs 54 which are adhesively or otherwise secured to the interior wall of the housing 36 and are sized to accommodate the fluid flow requirements of the static foam generator.

Figure 4:
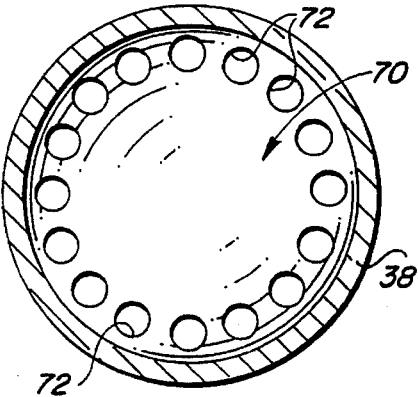
FIG. 4 is a view of the upstream concave surface of a second splash plate disc that can be used in the splash plate mixer of the present invention.

A splash plate disc, such as the splash plate disc 70 of FIG. 4, with a series of circular openings 72 arranged in an annular row adjacent the peripheral edge of the splash plate disc can be used in the static splash plate mixer 26 in place of splash plate disc 44. However, the turbulent flow generated by the splash plate disc 70 of FIG. 4 is not as effective in forming the foam mixture as the circular turbulent flow generated within the static splash plate mixer 26 by the splash plate disc 44.

The upstream end cap 40 is provided with a pair of inlet tubes 58 and 60 for introducing the pressurized air from the source 22 and the pressurized liquid polymeric latex coating from the coating feed tank 24 respectively into the upstream chamber 48 of the housing 36. The inlet tubes 58 and 60 extend through the upstream wall of the end cap 40 and into the upstream chamber 48 where the inlet tubes are directed toward the central portion of the concave surface 46 of the static splash plate disc 44. The inlet tube 58 discharges a stream of pressurized air which is directed at the central portion of the splash plate disc 44 and the inlet tube 60 discharges a stream of pressurized liquid polymeric latex coating which is also directed at the central portion of the splash plate disc. The air and polymeric latex coating streams intersect immediately upstream of or at the surface 46 of the splash plate disc 44 to initiate the mixing of the air and the liquid polymeric latex coating to form a foam.

After the air and liquid polymeric latex coating impinge upon the central portion of the concave surface 46 of the splash plate disc 44, the air/coating mixture is deflected from the surface in an outward circular motion toward the concave surface of the upstream end cap 40 as schematically illustrated by the arrows in FIG. 2. This swirling or circular motion further mixes the pressurized air as bubbles in the liquid polymeric latex coating to form a coarse air/polymeric latex foam coating. This coarse foam fills the upstream chamber 48 and is forced through the scalloped openings 52 in the periphery of the splash plate disc 44 into the downstream chamber 50.

As shown in FIG. 2, the downstream chamber 50 is provided with a discharge tube 62 which extends through the end cap 42 and well into the chamber 50. This requires the coarse foam coming from the upstream chamber through the scalloped openings 52 to make several more directional changes before exiting the static splash plate mixer 26 through the discharge tube 62. As shown in FIG. 2, the coarse foam, passing through the scalloped openings in the splash plate disc 44, flows along the wall of the downstream chamber to the end cap 42 where it is deflected off the concave surface 43 of the end cap back toward the convex surface of the splash plate 44. After several directional changes, the coarse foam flows from the downstream chamber 50 through the discharge tube 62 and into the static refining mixer 28.

Figure 5:
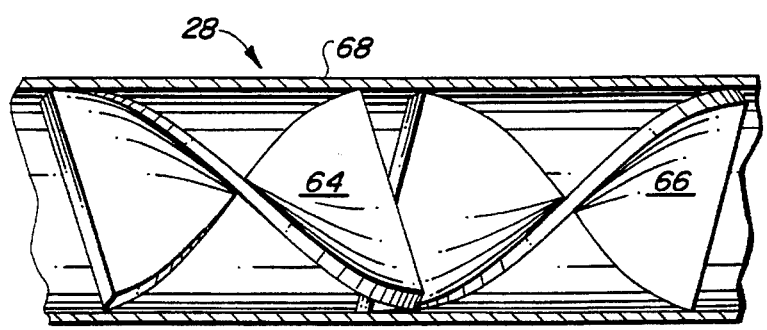
FIG. 5 is a longitudinal section through a commercially available static refiner used in the static foam generator of the present invention.

In the static refining mixer 28, the coarse polymeric latex foam coating formed in the static splash plate mixer 26 is further refined and homogenized to reduce the size of the air bubbles and disperse the air bubbles more evenly throughout the polymeric latex foam coating. A portion of a commercially available static refining mixer 28 is illustrated in FIG. 5. The static refining mixer utilizes a series of alternate right and left hand helical elements 64 and 66 in a tubular housing 68 to effect the further refinement and homogenization of the polymeric latex foam coating. Static refining mixers, such as the one illustrated in FIG. 5, are sold by Chemineer, Inc. of North Andover, Mass. under the tradename Kenics Static Mixers. As the polymeric latex foam coating flows over the helical elements 64 and 66, a rotational motion is given to the foam to further refine the foam before the foam is delivered to the application heads or nozzles 30.

From the static refining mixer 28, the homogeneous polymeric latex foam coating passes through the application heads or nozzles 30 which apply the polymeric latex foam coating to the surface of the duct board or other workpiece. The foam has a consistency approximating the consistency of shaving cream and forms a coating to encapsulate glass fibers and dust within the surface of the workpiece or duct board 34.

The static foam generator of the present invention was used to apply a polymeric latex coating, such as an Evode-Tanner XA 9900 series polymeric latex coating to a glass fiber workpiece. When the static splash plate mixer 26 was used in conjunction with the static refining mixer 28, the polymeric latex foam coating was properly refined and the application of the foam coating to the workpiece was successful. When the static splash plate mixer 26 was not used in conjunction with the static refining mixer 28, the polymeric latex foam coating was insufficiently refined and the application of the foam to the workpiece was unsatisfactory.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An air/liquid static splash plate mixer comprising:

a tubular housing having an upstream end and a downstream end;

a splash plate mounted within said tubular housing intermediate the upstream end and the downstream end of said tubular housing; said splash plate dividing said tubular housing into an upstream chamber and a downstream chamber; said splash plate having a concave upstream surface, an impervious central portion, and having openings therein adjacent a periphery of said splash plate to permit a coarse foam formed in said upstream chamber from pressurized air and a pressurized liquid to flow into said downstream chamber;

pressurized air inlet means in said upstream chamber for introducing a pressurized air stream into said upstream chamber and directing the pressurized air stream toward said impervious central portion of said splash plate;

pressurized liquid inlet means in said upstream chamber for introducing a pressurized liquid stream into said upstream chamber and directing the pressurized liquid stream toward said impervious central portion of said splash plate to intersect the pressurized air stream adjacent said upstream concave surface of said splash plate to mix the pressurized liquid stream with the pressurized air stream and form a foam; and an outlet means in said downstream chamber for discharging the coarse foam from said housing.

2. The air/liquid static splash plate mixer of claim 1, wherein: said outlet means in said downstream chamber is a tubular element extending into said downstream chamber through said downstream end of said housing with a discharge opening communicating with said downstream chamber at a location spaced inwardly from said downstream end of said housing to cause the foam flowing through said downstream chamber to change direction several times as the foam passes through said downstream chamber to further refine the foam before the foam exits the static splash plate mixer.

3. The air/liquid static splash plate mixer of claim 1, wherein: said openings for permitting said coarse foam to flow from said upstream chamber to said downstream chamber are scalloped openings.

4. The air/liquid static splash plate mixer of claim 3, wherein: said outlet means in said downstream chamber is a tubular element extending into said downstream chamber through said downstream end of said housing with a discharge opening communicating with said downstream chamber at a location spaced inwardly from said downstream end of said housing to cause the foam flowing through said downstream chamber to change direction several times as the foam passes through said downstream chamber to further refine the foam before the foam exits the static splash plate mixer.

5. In a static foam generator comprising, a liquid coating feed tank; means for delivering a liquid coating under pressure from said liquid coating feed tank to a refining mixer; a source of pressurized air; means for delivering pressurized air from said source of air to said refining mixer; said refining mixer being a static refining mixer for refining and homogenizing an air/liquid foam; application means for applying said foam to a workpiece; and means for delivering said foam from said refining mixer to said application means; the improvement comprising:

an air/liquid static splash plate mixer intermediate said liquid coating feed tank and said source of air and said static refining mixer for mixing the pressurized air and pressurized liquid to form a coarse foam which is delivered to said static refining mixer; said static splash plate mixer comprising:

a tubular housing having an upstream end and a downstream end;

a splash plate mounted within said tubular housing intermediate the upstream end and the downstream end of said tubular housing; said splash plate dividing said tubular housing into an upstream chamber and a downstream chamber; said splash plate having openings therein adjacent the periphery of said splash plate to permit an air/liquid foam to flow from said upstream chamber to said downstream chamber;

air inlet means in said upstream chamber for introducing a pressurized air stream into said upstream chamber;

liquid inlet means in said upstream chamber for introducing a pressurized liquid stream into said upstream chamber to mix with the pressurized air stream and form a foam; and an outlet means in said downstream chamber for discharging an air/liquid foam formed in said static splash plate mixer from said static splash plate mixer to said refining mixer.

6. The static foam generator of claim 5, wherein: an upstream surface of said splash plate is concave.

7. The static foam generator of claim 6, wherein: said air inlet means directs the pressurized air stream toward a central portion of said splash plate and said liquid inlet means directs the pressurized liquid stream toward the central portion of said splash plate.

8. The static foam generator of claim 7, wherein: said air inlet means directs the pressurized air stream and said liquid inlet means directs the pressurized liquid stream so that the streams intersect.

9. The static foam generator of claim 8, wherein: the pressurized air stream and the pressurized liquid steam intersect adjacent the upstream surface of said splash plate.

10. The static foam generator of claim 9, wherein: said openings for permitting said foam to flow from said upstream chamber to said downstream chamber are scalloped openings.

11. The static foam generator of claim 10, wherein: said outlet means in said downstream chamber is a tubular element extending into said downstream chamber through said downstream end of said housing with a discharge opening communicating with said downstream chamber at a location spaced inwardly from said downstream end of said housing to cause the foam flowing through said downstream chamber to change direction several times as the foam passes through said downstream chamber to further refine the foam before the foam exits the static splash plate mixer.

12. The static foam generator of claim 5, wherein: said air inlet means directs the pressurized air stream toward a central portion of said splash plate and said liquid inlet means directs the pressurized liquid stream toward the central portion of said splash plate.

13. The static foam generator of claim 12, wherein: the pressurized air stream and the pressurized liquid stream intersect adjacent an upstream surface of said splash plate.

14. The static foam generator of claim 13, wherein: said openings for permitting said foam to flow from said upstream chamber to said downstream chamber are scalloped openings.

* * * * *